John Chappel's Milk Refrigerator.

No. 120,491.    Patented Oct. 31, 1871.

Witnesses
John A. Elles
J. Q. White

Inventor
John Chappel,
Per,
J. H. Alexander
Atty.

UNITED STATES PATENT OFFICE.

JOHN CHAPPEL, OF CHENANGO FORKS, NEW YORK.

IMPROVEMENT IN MILK-REFRIGERATORS.

Specification forming part of Letters Patent No. 120,491, dated October 31, 1871.

*To all whom it may concern:*

Be it known that I, JOHN CHAPPEL, of Chenango Forks, in the county of Broome and State of New York, have invented certain new and useful Improvements in Milk-Refrigerators; and I do hereby declare that the following is a full, clear, and exact description thereof, reference being had to the accompanying drawing and to the letters of reference marked thereon, which form a part of this specification.

The nature of my invention consists in the construction and arrangement of a milk-refrigerator, as will be hereinafter more fully set forth.

In order to enable others skilled in the art to which my invention appertains to make and use the same, I will now proceed to describe its construction and operation, referring to the annexed drawing, in which—

Figure 1:
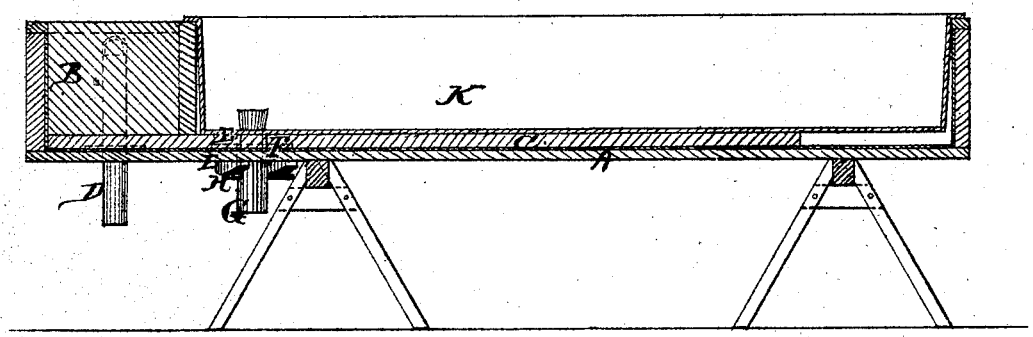
Figure 2:
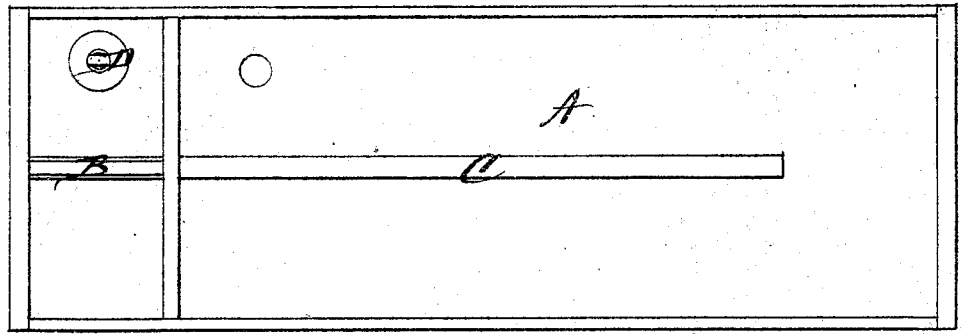

Figure 1 is a longitudinal vertical section, and Fig. 2 a plan view of my milk-refrigerator.

A represents the vat, lined on the inside with paper or cloth, and painted so as to make it water-proof. In the ice-box, at one end of the vat A, is a partition, B, and from said partition a ward, C, runs longitudinally on the bottom of the vat A, leaving, however, a space at the opposite end of the vat. The partition between the vat and ice-box does not extend down close to the bottom, but leaves a suitable aperture. The object of the partition B and ward C is to form a current of water under the pan by dipping the water from one side of the ice-box to the other over the division B. In the ice-box is a water-gauge, D, for the purpose of raising or lowering the water on the faucet. K is the pan placed in the vat A. This pan is provided with a spout, G, passing downward through the bottom of the vat. The spout is on the under side of the pan, surrounded by a thimble, E, and packing F; and through the lower end of the spout is a hole for the insertion of a pin, H. Between said pin and the bottom of the vat is inserted a U-shaped wedge, I, for holding the pan securely in the vat, and making a water-tight joint by pressing the thimble E into the packing. The whole vat rests upon bends L L, as shown.

Having thus fully described my invention, what I claim as new, and desire to secure by Letters Patent, is—

1. The arrangement of the lined vat A, with its ice-box, division B in said ice-box, the ward C, and water-gauge D, all substantially as shown and described, and for the purposes herein set forth.

2. The pan K, provided with the spout G, which is surrounded by the thimble E and packing F, substantially as and for the purposes herein set forth.

3. The pin H and U-shaped wedge I, when used in connection with the spout G, pan K, and vat A, substantially as and for the purposes herein set forth.

4. The combination of the lined vat A with its ice-box, division B, ward C, water-gauge D, pan K, spout G, thimble E, packing F, pin H, and wedge I, all constructed and arranged to operate substantially as and for the purposes herein set forth.

In testimony that I claim the foregoing as my own I affix my signature in presence of two witnesses.

JOHN CHAPPEL.

Witnesses:
E. WARD BROWN,
W. LOOMIS. (58)